INVENTOR.
EMRYS C. JAMES

BY John V. Regan

ATTORNEY

INVENTOR.
EMRYS C. JAMES
BY John V. Regan
ATTORNEY

United States Patent Office 3,434,156

Patented Mar. 18, 1969

3,434,156

WRITE VERIFICATION FOR A RECORDING SYSTEM

Emrys C. James, Lake Park, Fla., assignor to Radio Corporation of America, a corporation of Delaware Filed Feb. 17, 1965, Ser. No. 433,294

U.S. Cl. 346—74 10 Claims

Int. Cl. G01d *5/12*

ABSTRACT OF THE DISCLOSURE

A write verification circuit which includes a single path common to a plurality of write amplifiers. Means coupled to this path senses whether or not write verification current is present and also determines, by sensing the duration and time of occurrence of this current, whether certain faults exist in a transducer to which write current is being applied.

This invention relates to recording systems and, in particular, to apparatus for verifying that the write logic, write amplifiers, magnetic heads and related circuitry are functioning properly during a write operation.

In modern information handling systems, computers for example, file information frequently is recorded in mass memory systems such as magnetic drums, disks or tapes. The accuracy of recording often is of paramount importance. For this reason, it is desired to perform a "write verify" check to determine that the write amplifiers, recording heads and related circuitry are functioning properly during a write operation, and that the information to be recorded actually reaches the selected recording head or heads. Prior art techniques for achieving this objective generally have been complex and costly in that they require a considerable amount of circuitry.

It is among the objects of this invention to provide improved means for performing a write verify check in a magnetic recording system.

It is a more specific object of this invention to provide an improved write verify arrangement that can be used in common with a plurality of magnetic recording heads and write amplifiers.

In apparatus embodying the invention, a plurality of write amplifiers has a common current path which carries the current for the selected recording head. A transformer primary winding is connected in the common current path, and write verify signals may be derived across the secondary winding. Proper operation of the selected recording head, etc., may be checked by examining the write verify signal at a selected time in the recording cycle. Means are provided for establishing a bias current in the primary winding. Other means are provided for effectively disabling the current path when it is desired to prevent recording.

Figure 1:
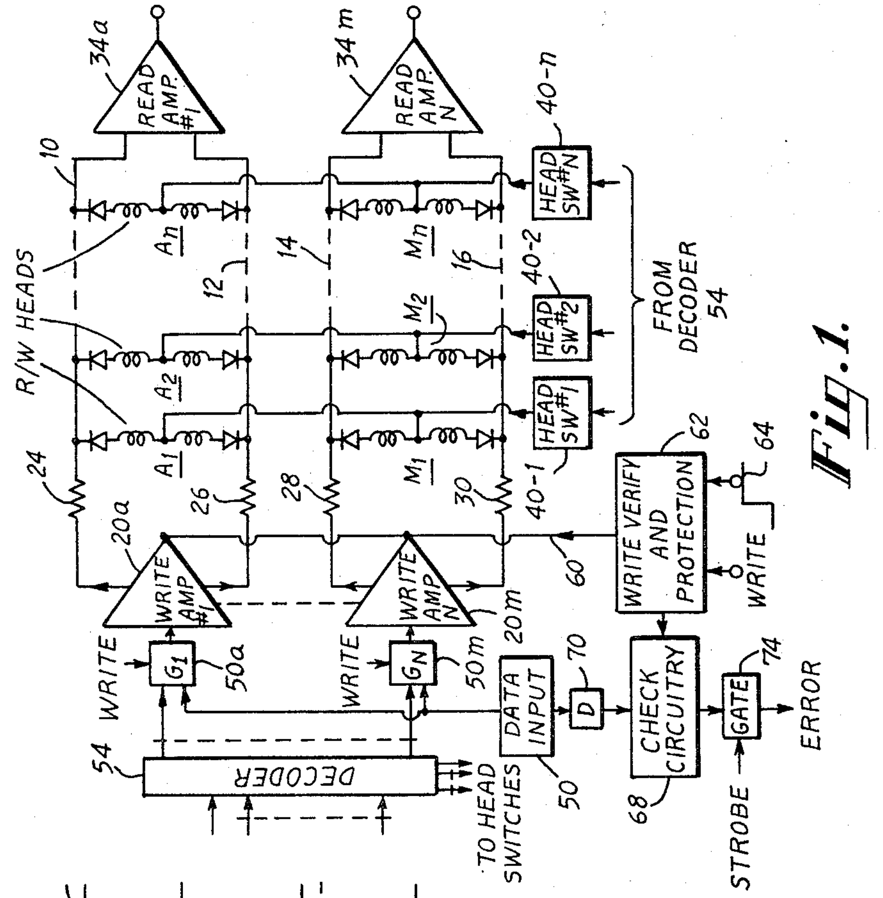
FIGURE 1 is a diagram, partly schematic and partly in block form, of a magnetic recording system in which the invention may be practiced.

In one form of mass memory system, there may be a plurality of magnetic recording drums or disks, each drum or disk having a large number of recording tracks thereon. A separate write amplifier may be provided for each buss in the memory system, common to the heads thereof, and means may be provided for selectively enabling the recording head associated with the track on which it is desired to record. Such a system is illustrated in partial form in FIGURE 1. The recording heads $A_1$, $A_2$ . . . $A_n$ may be associated with respective recording tracks on a first buss and recording heads $M_1$, $M_2$ . . . $M_n$ are a series of recording heads associated with different tracks on another buss. All of the recording heads, for example $A_1$ . . . $A_n$, associated with the same buss may be connected electrically in parallel by connecting their opposite ends through diodes to buss lines 10 and 12. Likewise, the heads $M_1$ . . . $M_n$ are connected in parallel between buss lines 14 and 16. Separate write amplifiers 20*a*, 20*m*, are provided for the respective busses and have first and second outputs respectively coupled to the buss lines 10, 12 and 14, 16 by way of current limiting resistors 24, 26 and 28, 30, respectively. In addition, a separate read amplifier 34*a*, 34*m* is provided for each buss.

A plurality of head switches 40–1, 40–2 . . . 40–*n* are provided equal in number to the number of recording heads associated with a single buss. The output of each switch is connected to the centertap of one head on each buss and, when that head switch is enabled, a low impedance path is provided from the centertaps of the associated heads to a point of reference potential by way of the switch.

Data to be recorded is supplied from an input source 50, the output of the data source being applied as a first input to a plurality of gates 50*a* . . . 50*m*, and the output of each gate is applied to the input of a different write amplifier. A second input of each of the gates is enabled when it is desired to perform a write operation. A third input to each of the gates 50*a* . . . 50*m* is supplied from a decoder 54, which decoder also supplies energizing signals to the head switches 40–1 . . . 40–*n*. In actual operation, a first output of the decoder enables the write amplifier associated with a selected buss, and a second output of the decoder 54 supplies an energizing signal to the head switch which is associated with the selected head on that buss.

All of the write amplifiers 20*a* . . . 20*m* are connected to a common current path 60 which carries the current to be supplied to the selected recording head. The data input signals supplied to the selected write amplifier from the data source 50 cause a recording signal current to flow in the common current line 60. This current is detected by circuitry (to be described) in a unit 62, designated "Write Verify and Protection." This unit also receives an energizing level "write" when it is desired to perform a write operation. In addition, a second input 64 is provided to the verify unit 62 to effectively block the common current path in the event that it is desired to prevent recording as, for example, during a power failure or other malfunction.

Output signals from the verify unit 62 are applied to check circuitry 68. The output of the data source 50 also is supplied to the check circuitry by way of a delay device 70, and the output of the check circuitry may be strobed in an AND gate 74. The AND gate 74, when strobed, provides an output signal in the event that an error has occurred due to a malfunction in the selected write amplifier, selected head or associated logic.

Figure 2:
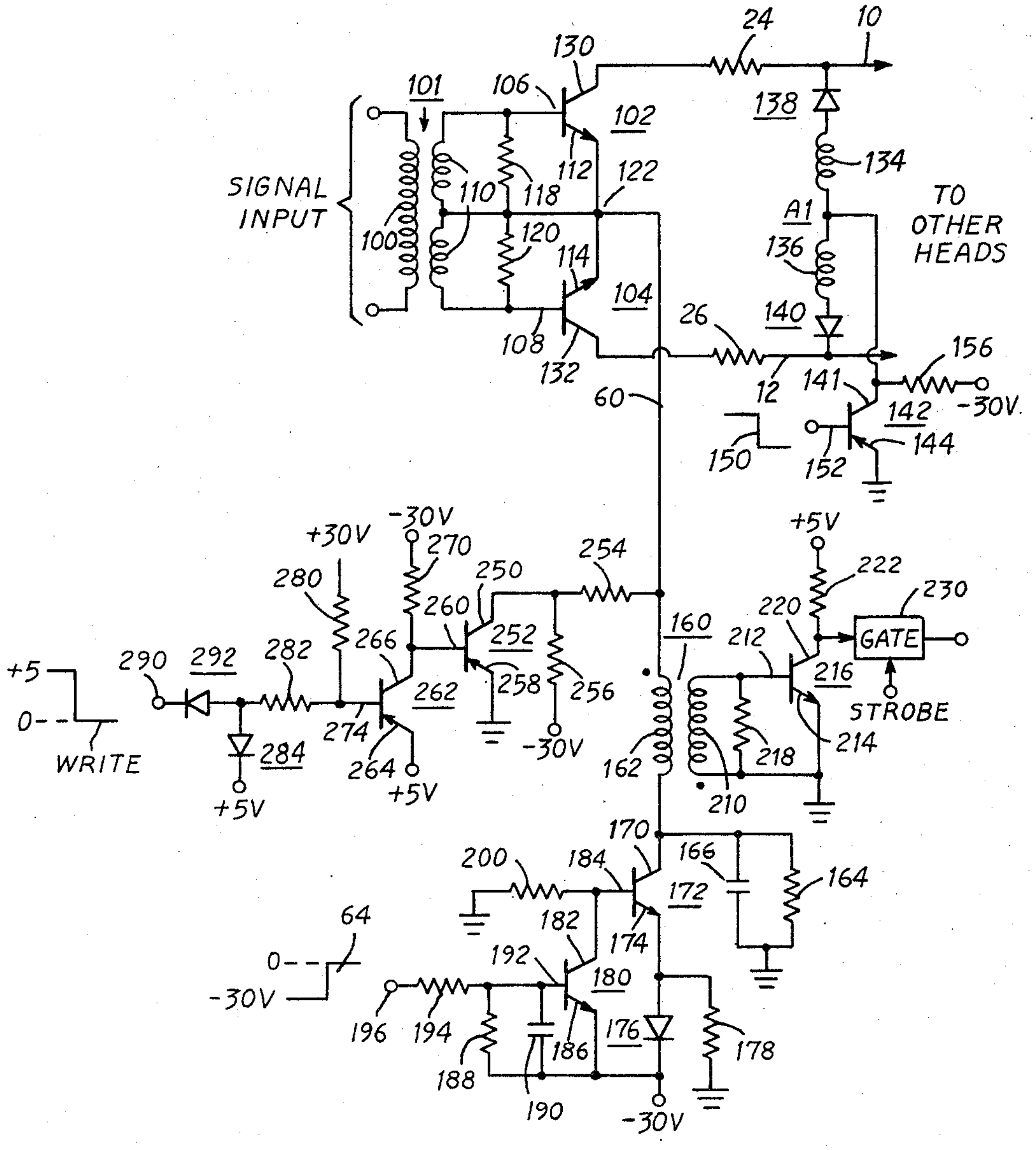
FIGURE 2 is a schematic diagram of the write verify circuitry.

A portion of one of the write amplifiers and head arrangement is illustrated schematically at the top of FIGURE 2. The signals to be recorded appear across the primary winding 100 of the selected write amplifier. Each amplifier also includes a pair of transistors 102, 104, illustrated as being NPN type transistors, having their base electrodes 106, 108, respectively, connected to the opposite ends of a split second winding 110. The centertip of the secondary winding 110 is connected in common to the emitter electrodes 112, 114 of the two transistors, and first and second resistors 118, 120 are connected between each base electrode 106, 108, respectively, and the centertap of winding 110. The common emitter junction 122 is connected to the common current line 60 previously mentioned.

Assuming that the write amplifier just described is the amplifier **20*a* (FIGURE 1), the collector electrodes 130 and 132 are connected through the current limiting resistors 24 and 26 to the buss lines 10 and 12, respectively. Head $A_1$ is illustrated in FIGURE 2 and comprises head windings 134 and 136 connected in series with diodes 138 and 140 between the buss line 10 and 12. The centertap of the head winding is connected to the collector electrode 141 of a PNP type transistor 142, the emitter electrode 144 of which is grounded. Transistor 142 is the head switch 40–1 (FIGURE 1), or a part thereof. The input 150 to the base 152 of this transistor normally has a value to bias the transistor 142 in the nonconducting condition. The centertap of the head winding then is returned to —30 volts by way of the collector resistor 156. When head $A_1$ is selected for recording, the input at the base 152 is switched to a low value to bias transistor 142** into, or close to saturation, whereby the voltage at the centertap of the head winding rises close to ground potential.

The WRITE VERIFY circuitry includes a transformer 160 having its primary winding 162 connected in series with the common current path 60. The lower end of winding 162 is connected to circuit ground through the parallel combination of a resistor 164, of relatively large value, and a capacitor 166. Winding 162 also is connected to the collector electrode 170 of an NPN transistor 172. The emitter 174 of this transistor is connected by way of a diode 176 a point of —30 volts operating potential. Diode 176 is poled in a direction to conduct transistor current in the forward direction thereof. A resistor 178 is connected between emitter 174 and circuit ground. Another NPN transistor 180 has its collector 182 connected directly to the base 184 of transistor 172 and has its emitter 186 returned to —30 volts. The parallel combination of a resistor 188 and capacitor 190 is connected between the base 192 of transistor 180 and —30 volts, and a resistor 194 is connected between base 192 and an input terminal 196.

In normal operation, the voltage applied at input terminal 196 may be, for example, —30 volts or such other value as to bias transistor 180 in a nonconducting condition. The base 184 of transistor 172 then is returned to ground potential through a resistor 200, whereby transistor 172 is biased into saturation and provides a very low impedance path between the lower end of primary winding 162 and —30 volts. In the event that there should be a power failure somewhere in the system, or if for other reasons, it should be desired to prevent the recording of information, the input voltage at terminal 196 is switched to a value to bias transistor 180 into saturation. This has the effect of "shorting" the base 184 of transistor 172 to —30 volts, whereby transistor 172 becomes nonconducting. The signal current for the selected head then must flow over the common current path 60 and through the relatively large resistor 164 to circuit ground. The relatively large value of this resistor 164, together with the ground potential to which it is connected, limit the current in the common path 60 to such a low value that no signals can be recorded.

Transformer 160 has a secondary winding 210 which is connected across the base 212-emitter 214 junction of an NPN transistor 216. A resistor 218 is connected in parallel with the secondary winding 210 to dissipate the energy therein when the transistor 216 is nonconducting. Collector electrode 220 is connected to a source of operating potential of +5 volts by way of a supply resistor 222. The output at collector 220 may be supplied to the check circuitry 68 (FIGURE 1). As an alternative, the collector may be connected to one input of a gate 230, and the gate may be strobed at a selected time in the operating cycle.

Although only one write amplifier is illustrated in FIGURE 2, it will be understood that the common emitter junction, for example points 122 (not shown), of the other write amplifiers also are connected to the common path 60 at a point or points above the primary winding 162 of transformer 160. The collector electrode 250 of a PNP transistor 252 is also connected at such a point by way of a resistor 254, and is connected by way of a supply resistor 256 to —30 volts. Emitter electrode 258 thereof is grounded. Transistor 252 is operated under control of another PNP transistor 262 which has its emitter electrode 264 returned to the +5 volt supply. The collector electrode 266 of this transistor is connected directly to the base 260 of transistor 252 and is connected to the —30 volt supply by way of a resistor 270. The base 274 bias circuitry for transistor 262 includes a resistor 280 connected between the base 274 and a point of +30 volts. A resistor 282 and a diode 284 are serially connected, in that order, between base 274 and the +5 volt supply. Input signals applied at an input terminal 290 are coupled to the base circuitry by way of a diode 292.

All of the voltage sources described above and appearing in FIGURE 2 may be batteries, by way of example. The sources of positive voltage may be batteries having their negative terminals connected to circuit ground; sources of negative voltage may be batteries having their positive terminals grounded.

Consider now the operation of the circuit. Common current line 60 carries the signal current for the transistors 102, 104 of the selected write amplifier and selected read/write head during a write operation. When no information is being written, as in a non-write operation, the transistors 102, 104 of all write amplifiers are biased in a nonconducting condition. If it were not for the transistor 252 and its related circuitry, no current would flow through the transformer 160 primary winding 162 at this time. It has been found desirable to provide a D.C. bias current for the transformer 160 in the quiescent state to establish a magnetic field therein, whereby the transformer stores energy in the quiescent state. In the absence of such D.C. bias, it is possible that the transformer secondary 210 and the output transistor 216 may not respond properly to the first few write signals. Accordingly, during a non-write operation, a voltage of +5 volts is applied at the input terminal 290. This voltage has a value to bias transistor 262 in a nonconducting condition, whereby the —30 volts at its collector 266 is applied to the base of transistor 252 through resistor 270. Transistor 252 then is in saturation, and a D.C. current flows through this transistor, resistor 254, primary winding 162 and the low impedance collector-emitter path of transistor 172 to the —30 volt supply. The output transistor 216 does not conduct at this time, and the output voltage at its collector 220 is approximately +5 volts.

When it is desired to record information on a selected track of the drum, disk, etc., the decoder 54 (FIGURE 1) enables the head switch 40–1 . . . **40–*n* associated with the selected track, and also primes one input of the gate 50*a* . . . 50*m* of the associated write amplifier. For example, if head $A_1$ is selected, the decoder 54 may apply a negative level 150 at the base of the transistor 142 (FIGURE 2) to bias this transistor into saturation. The centertap of head $A_1$ then is grounded. In addition, the voltage at input terminal 290 is changed to a value close to ground potential to bias transistor 262 into saturation. This has the effect of turning off transistor 252 at the beginning of the write operation, whereby the D.C. bias current ceases to flow through primary winding 162, and the current previously flowing through transistor 172 is available for the transistors 102, 104** in the selected write amplifier.

Figure 3:
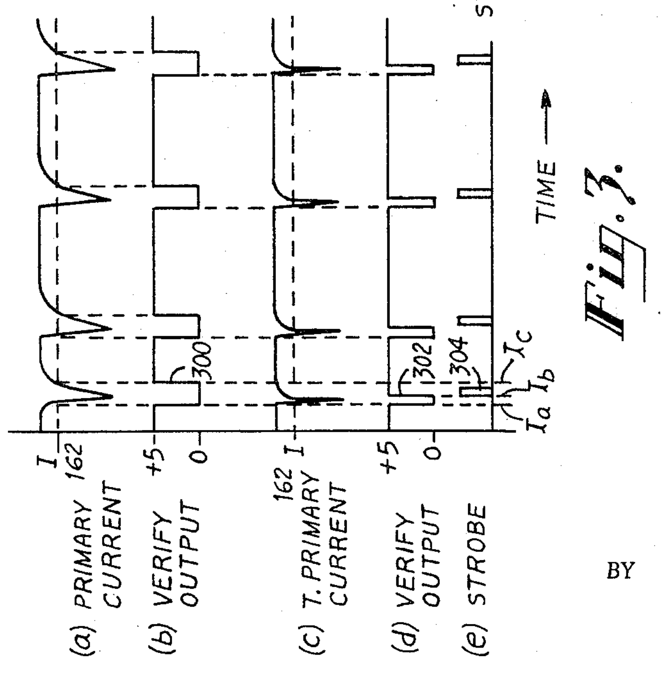
FIGURE 3 is a set of waveforms useful in describing the operation of the verify circuitry.

In a recording system employing phase modulation, the current flowing in the common current line 60 may have the form illustrated in FIGURE 3, row (*a*). This current is the total current flowing through both of the transistors 102, 104. This current changes from a relatively high value to a relatively low value, in response to a change in signal applied across the input transformer 101. The resulting voltage developed across the secondary winding 210 of transformer 160 has a value to drive output transistor 216 into saturation. This operation is shown in FIGURE 3, row (*b*) at time $t_a$. When the current through the primary winding 162 changes from its lowest value and begins increasing in value, the voltage developed across the secondary winding 210 is in a direction to turn off output transistor 216. However, saturated transistor 216 operates to clamp the current flowing through the secondary winding 210, whereby there is a lag in the turnoff of the output transistor 216. This lag, together with the inductive time constant of the recording head determines the width of the output pulse at collector 220. That is to say, the inductive time constant of the recording head determines the wave shape of the current through the primary winding 160 (row (*a*), FIGURE 3). Output transistor 216 remains in a conducting state until the current through the primary winding has reached a value I, which occurs at a time $t_c$. Accordingly, the pulse 300 (row (*b*)) at the collector of output transistor 216 has a duration $t_a$ to $t_c$.

If the winding in the selected head were open-circuited, no current would flow through the primary winding 162, and output transistors 216 never would become conducting. On the other hand, if the head winding should become shorted, this would have the effect of reducing the time constant in the common current path, as shown in row (*c*) FIGURE 3. As noted there, the current may rise rapidly from its lowest value to its highest value, whereby the primary current reaches the value I at a time $t_b$. As mentioned previously, output transistor 216 turns off when the primary current reaches the value I. In this case, therefore, a negative output pulse 302 appears at the collector 220 during the time interval $t_a$ to $t_b$, and this output pulse is of much shorter duration than the pulse 300 which is developed when the head winding is not shorted (row (*b*)).

A defective head may be detected by strobing the gate 230 sometime during the interval $t_b$ to $t_c$ (row (*e*)). Gate 230 is one which provides an output if the voltage at collector 220 is at ground potential during the strobe period, whereby an output is derived when the recording head, write amplifier and associated logic are functioning properly (row (*a*)), but no output is derived when the head is shorted (row (*d*)) or when the write amplifier fails to operate.

In the alternative, gate 230 may be omitted, and the output at collector 220 may be fed directly to the check circuitry 68 (FIGURE 1) for comparison with the data from source 50. In the latter event, the output of the check circuitry 68 may be strobed during the period $t_b$ to $t_c$ by applying the strobe pulse 304 to the AND gate 74 (FIGURE 1).

If an error is detected during a write operation, an output will be generated by the AND gate 74. In that event, it may be desirable to prevent further recording of information. Also, it may be desirable to prevent recording in the event of a power failure elsewhere in the system, or upon the occurrence of some other malfunction. This may be achieved by raising the level 64 at input terminal 196 (FIGURE 2) to a value sufficient to turn on transistor 180. Transistor 172 then becomes nonconducting and removes the low impedance path between the primary winding 162 and the −30 volt supply. Signal current then must flow through the relatively large resistor 164, and this resistor is chosen to have a value to limit the signal current to a low enough value to prevent recording.

What is claimed is:

1. The combination comprising:
a plurality of magnetic recording heads;
a plurality of write amplifiers for said heads, each write amplifier being connected to a different group of heads;

a path which is common to all of said amplifiers through which the current conducted by an amplifier flows when said amplifier is supplying write current to a recording head;
a transformer having a primary winding through which said write current also flows, connected in said common current path, and having a secondary winding; and
utilization means connected to said secondary winding.

2. The combination comprising:
a plurality of magnetic recording heads;
a plurality of write amplifiers for said heads;
a source of data input signals to be recorded;
means selectively coupling said data source to one of said amplifiers;
a current path common to the plurality of write amplifiers through which the current, applied to a recording head by a selected amplifier, flows;
a transformer having a primary winding connected in said current path, and having a secondary winding; and
checking circuitry coupled to said secondary winding and to the output of said data source.

3. The combination comprising:
a plurality of magnetic recording heads;
a plurality of write amplifiers for said heads;
a signal current path common to said amplifiers;
a transformer having a primary winding connected in said current path, and having a secondary winding;
a source of signals to be recorded;
means coupling said source of signals to a selected amplifier and, in turn, effecting a change in current in said common path, said change in current persisting for a first period $t_c$ when the head associated with the selected amplifier is functioning properly, and persisting for a period $t_b < t_c$ when that head is shorted;
utilization means coupled to said secondary winding; and
means for strobing said utilization means sometime during the period $t_b$ to $t_c$.

4. The combination comprising:
a plurality of magnetic recording heads;
a plurality of write amplifiers each connected to a different combination of heads;
a common current path for said amplifiers;
a transformer having a primary winding connected in said common current path, and having a secondary winding;
a plurality of head switches each energizable to complete a conduction path between said common current path and one head of each said combination of heads;
means for applying an energizing signal to a selected head switch;
means for applying input signals to a selected write amplifier to cause a change in current in the common current path and the enabled head common to that amplifier, the change in current in said common path persisting for a period $t_c$ when said enabled head is functioning properly, and persisting for a period $t_b < t_c$ when said enabled head is shorted; and
means for strobing said utilization means sometime during the period $t_b$ to $t_c$.

5. The combination comprising:
a plurality of magnetic recording heads;
a plurality of write amplifiers for said heads;
a common current path for said amplifiers which conducts current when any one of said amplifiers applies a write current to a head;
a transformer having a primary and a secondary winding;
a first transistor having its collector-emitter path serially connected with said transformer primary in said common current path;

a second transistor having a base, an emitter, and a collector;

said transformer secondary being connected across said base and said emitter; and output means connected at the collector of said second transistor.

6. The combination comprising:

a plurality of magnetic recording heads;

a current path common to all of said heads through which write current flows when any of said heads is enabled;

a first transistor having a collector-emitter path connected between said current path and a point of first fixed potential;

means normally biasing said first transistor in a conducting state;

a transformer having a primary winding connected in said current path between said first transistor and said recording heads, said transformer also having a secondary winding;

a second transistor having a collector-emitter path connected between a point of second fixed potential, different from said first fixed potential, and a point on said current path between said primary winding and said heads;

means biasing said second transistor in a conducting condition during a nonrecording operation to establish a bias current in said primary winding; and utilization means connected to said secondary winding.

7. The combination comprising:

a plurality of magnetic recording heads;

a plurality of write amplifiers for said heads;

a signal current path common to said amplifiers through which current flows when any of said amplifiers applies a write current to a head;

a transistor having a collector-emitter path;

a transformer having a primary winding and a secondary winding;

means connecting said current path through said primary winding and said collector-emitter path, in that order, to a point of fixed potential;

utilization means connected to said secondary winding; and means for applying a signal to said transistor having a value to turn off said transistor when it is desired to prevent recording.

8. The combination comprising:

a plurality of magnetic recording heads;

a plurality of write amplifiers for said heads;

a signal current path common to said amplifiers through which write current flows when any of said amplifiers applies a current to a head;

a transistor having a collector-emitter path connected between said current path and a point of operating potential;

a transformer having a primary winding connected in said current path between said transistor and said write amplifiers;

means normally biasing said transistor in a conducting state;

a source of data signal to be recorded;

means selectively coupling said data source to a write amplifier; and a checking circuit connected to said secondary winding and to the output of said data source.

9. The combination comprising:

a plurality of groups of magnetic recording heads;

a plurality of write amplifiers each common to the heads of a different group;

a current path common to all of said amplifiers;

a first transistor having a collector-emitter path connected between said current path and a point of first operating potential;

means normally biasing said first transistor in a conducting state;

a transformer having a primary winding connected in said current path between said first transistor and said write amplifiers, said transformer also having a secondary winding;

a second transistor having a collector-emitter path connected between a point of second operating potential, different in value from said first operating potential, and a point on said current path between said primary winding and said write amplifiers;

means biasing said second transistor in a conducting state during a non-recording operation to establish a bias current in said primary winding; and output means connected to said secondary winding.

10. The combination as claimed in claim 9, wherein said output means is a checking circuit, a source of signals to be recorded, means selectively coupling said source to one of said amplifiers, and means coupling said source to said checking circuit.

References Cited

UNITED STATES PATENTS

| | | | |
|---|---|---|---|
| 3,359,548 | 12/1967 | Yoshii et al. | 340—174.1 |
| 2,919,968 | 1/1960 | Fernandez-Rivas et al. | 340—174.1 |

OTHER REFERENCES

IBM Technical Bulletin, vol. 3, No. 7, December 1960, p. 30.

BERNARD KONICK, *Primary Examiner.*

BARRY L. HALEY, *Assistant Examiner.*

U.S. Cl. X.R.

340—174.1